United States Patent
Johnston

(10) Patent No.: US 6,412,430 B1
(45) Date of Patent: Jul. 2, 2002

(54) COMPACT LOAD BEARING WEBBING ATTACHMENT METHOD

(75) Inventor: Jeffry L. Johnston, Deland, FL (US)

(73) Assignee: Mirage Systems Inc., Deland, FL (US)

( * ) Notice: Subject to any disclaimer, the term of this patent is extended or adjusted under 35 U.S.C. 154(b) by 0 days.

(21) Appl. No.: 09/919,450

(22) Filed: Jul. 31, 2001

(51) Int. Cl.⁷ .................. D05B 1/18; B65D 17/30
(52) U.S. Cl. .................. 112/475.06; 112/475.08; 244/151 R
(58) Field of Search .............. 112/475.06, 470.33, 112/470.34, 475.08, 475.14, 405, 406, 418; 280/801.1, 802, 808; 244/142, 151 R, 151 A

(56) References Cited

U.S. PATENT DOCUMENTS

| | | | |
|---|---|---|---|
| 2,770,204 A | * 11/1956 | Brownstein | 112/470.33 |
| 3,438,177 A | * 4/1969 | Houston | 38/90 |
| 4,194,652 A | * 3/1980 | Williamson et al. | 112/475.08 |
| 4,231,616 A | * 11/1980 | Painter | |
| 4,378,921 A | * 4/1983 | Allen et al. | 244/151 R |
| 5,860,706 A | * 1/1999 | Fausel | |

* cited by examiner

*Primary Examiner*—Ismael Izaguirre
(74) *Attorney, Agent, or Firm*—John V. Stewart

(57) ABSTRACT

Flexible strap is passed around an elongated portion 11 of load-bearing hardware 10, and the two ends 2, 3 of the strap are overlapped, held in a curve, and stitched together. The overlapped strap portion is then centered around the elongated hardware portion and is formed into an eye that retains the elongated hardware portion. The eye is closed by stitching through all four strap layers of the strap extending from both sides of the hardware portion. A confluence wrap 5 is preferably wrapped around the eye closure area before this stitching. Preferably a nylon buffer is placed in the eye between the hardware and strap, and stitched in the eye closure area, to prevent chafing of the strap on the hardware. The curvature sewn into the overlapped strap ends provides even distribution of stress on the two ends when a load is placed on the hardware.

7 Claims, 2 Drawing Sheets

FIG 4
FIG 5
FIG 6
FIG 7
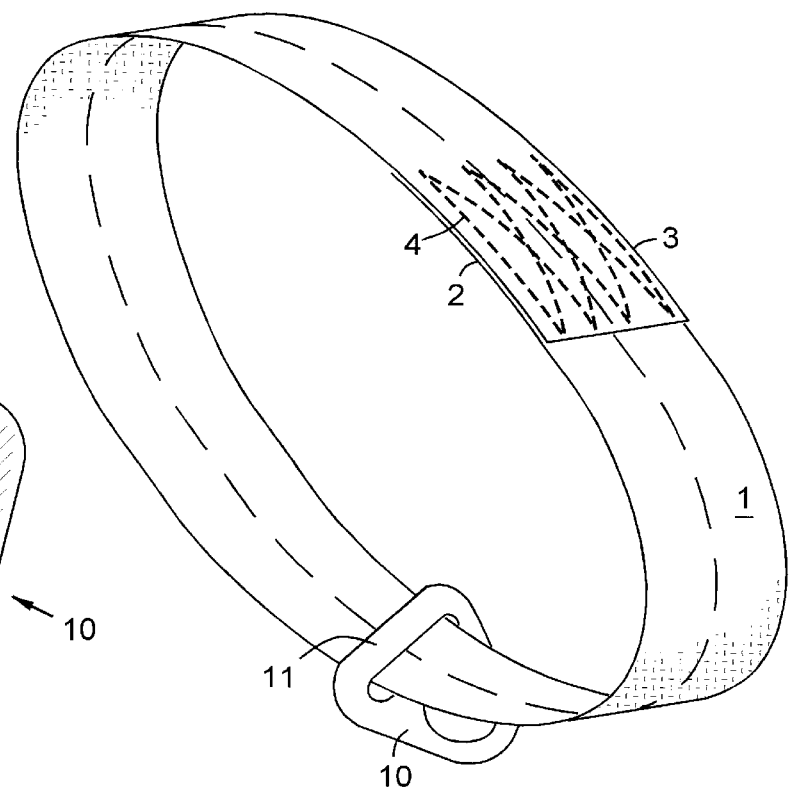
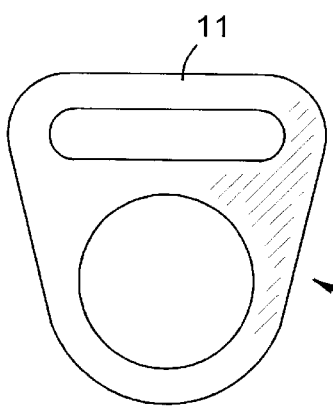
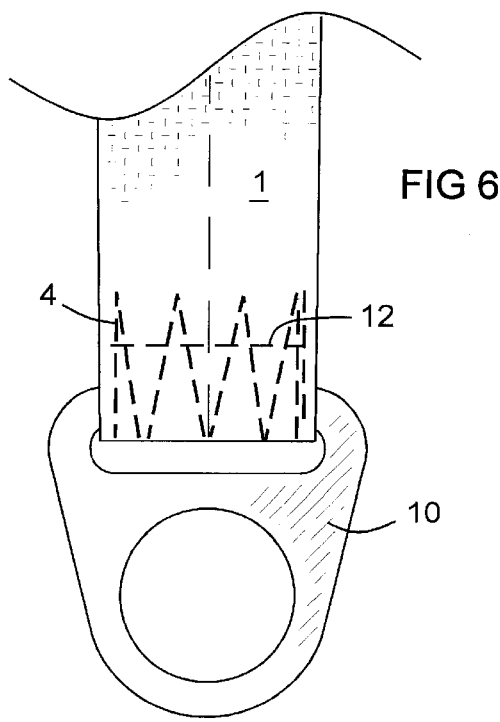
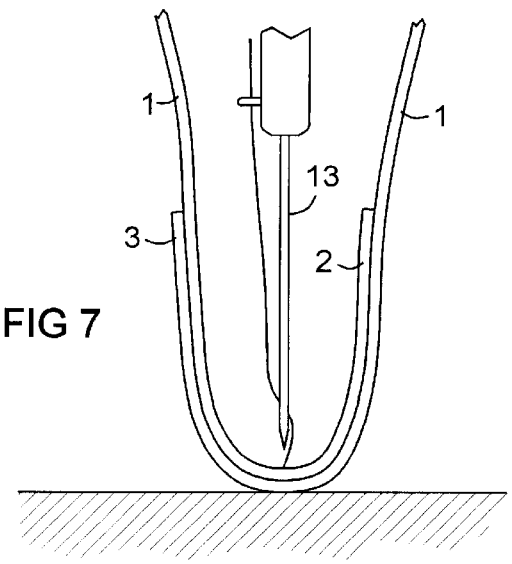

COMPACT LOAD BEARING WEBBING ATTACHMENT METHOD

BACKGROUND OF THE INVENTION

1. Field of the Invention

This invention relates to attaching hardware to lengths of fabric strap to transmit loads between objects.

2. Description of Prior Art

A problem occurs when attaching hardware to short lengths of webbing, or to sections of webbing which must be also used for other purposes, such as attaching other hardware or accessories. The stitching necessary to firmly affix hardware to webbing must be sufficient in length to grant adequate strength to the bond, but cannot occupy too much valuable space along the length of the webbing. Prior webbing attachment methods require a substantial overlap of webbing to be sewn together after the webbing is passed around an elongated portion of load bearing hardware. The overlapped webbing takes space between attachment points that requires a substantial separation between attachment points.

The prior solution for creating a load bearing attachment point involves threading the load bearing webbing through the attachment hardware, then back on itself (FIG. 1). A stitch pattern is then applied where the webbing overlaps, attaching the two ends of webbing to each other. The hardware is held inside the resulting loop of webbing. The length of the stitch pattern is approximately two times the width of the webbing being sewn, which results in a bond that is stronger than the webbing alone.

A problem with the prior attachment method is that it requires a long stitch pattern—at least double the width of the webbing. This limits use of the prior method to applications with adequate space for the stitch pattern extending from the attachment point. In short or confined spaces, the prior method is inadequate.

SUMMARY OF THE INVENTION

The objective of the present invention is a method of attaching load-bearing webbing to hardware that requires less space beyond the hardware than prior methods, but is equally as strong.

This objective is achieved by using the portion of webbing that is wrapped around the elongated hardware portion to contain the overlap and the stitch pattern, thereby freeing a large amount of the adjacent webbing for other uses. The webbing stitch length is equal to the stitch length used in the prior solution, so strength is not compromised. Asymmetric stitching allows both ends of the overlapped webbing to receive equal stress despite the curvature of the overlap. A wrap around all four layers of overlapped webbing adjacent the elongated hardware portion is preferably provided.

BRIEF DESCRIPTION OF THE DRAWINGS

FIG. 4 is a perspective view of a step of the invented attachment method, in which a strap is passed around an elongated hardware portion, then the strap ends are overlapped and stitched together.

FIG. 5 is a front view of attachment hardware.

FIG. 6 is a front view of a step after FIG. 4, in which the strap overlap is centered around the elongated portion of hardware, closed to form an eye, and a light tack stitch is optionally sewn through all strap layers to hold the strap in position for permanent eye closure stitching.

FIG. 7 is a conceptual view of strap overlap stitching with curvature.

REFERENCE NUMBERS

Figure 1:
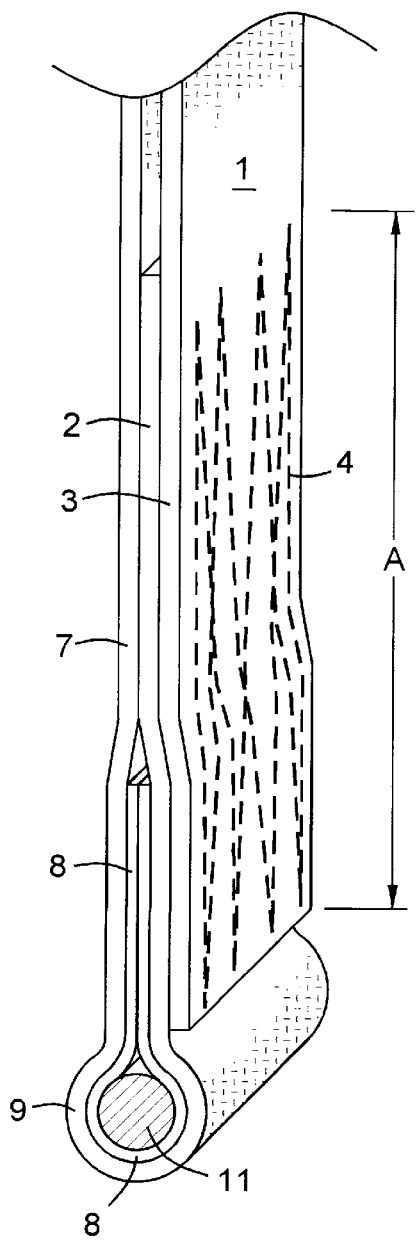
FIG. 1 is a perspective view of prior art webbing attached to load bearing hardware.

A. Webbing overlap extending from hardware in prior art
B. Reduced webbing overlap extending from hardware using the invented method
1. Webbing or strap
2. First end of webbing
3. Second end of webbing
4. Stitching through overlap of webbing
5. Confluence wrap
6. Stitching through all strap layers to close eye of strap
7. Portion of non-overlapped webbing extending from elongated portion of hardware in prior art
8. Nylon webbing buffer
9. Eye formed in webbing to retain elongated portion of hardware
10. Load-bearing hardware
11. Elongated portion of hardware for webbing attachment
12. Tack stitch
13. Stitching needle

TERMINOLOGY

Webbing: Flexible strap material, normally made of fabric.

DETAILED DESCRIPTION

FIG. 1 shows an example of a prior webbing attachment configuration. Webbing 1 is passed around an elongated portion 11 on load-bearing hardware 10. Then the two ends 2, 3 of the webbing are overlapped and stitched together adjacent the elongated hardware portion. The portion of webbing 7 on the opposite side of the elongated hardware portion from the overlapped webbing is included in the stitching. This fixes the attachment position of the hardware on the webbing. A nylon webbing buffer 8 is preferably wrapped around the elongated hardware portion inside the webbing and stitched in place to prevent chafing of the webbing. In this configuration, the whole length B of the stitching extends from the hardware, preventing close attachment of other hardware on the same webbing.

Figure 2:
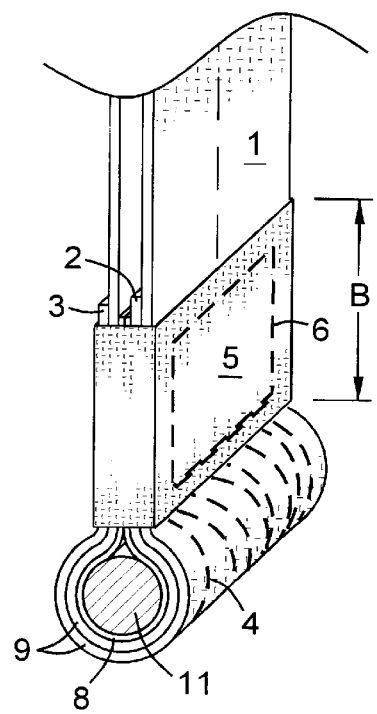
FIG. 2 is a perspective view of a compact webbing attachment to load bearing hardware according to the present invention.
Figure 3:
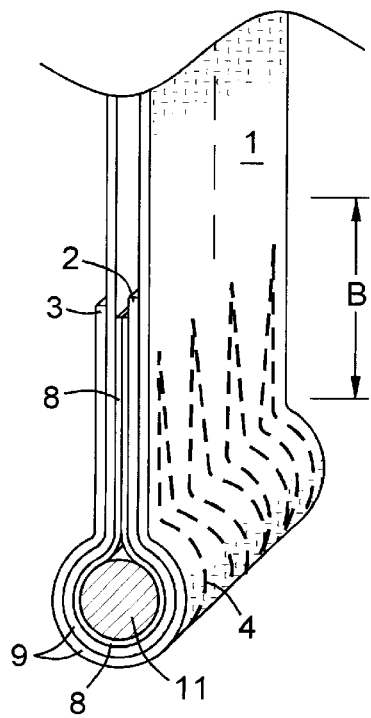
FIG. 3 shows the view of FIG. 2 without eye-closure stitching 6 and confluence wrap 5.

FIG. 2 shows webbing attached per the invented method. The overlapped portion of webbing wraps around the elongated hardware portion. The length of stitching is the same as in FIG. 1, but the length of stitching extending beyond the hardware is reduced to less than ⅓ of FIG. 1. For example, if length A is 3 inches, length B is about ¾ inch, more or less depending on the cross section diameter or minor diameter of the elongated hardware portion.

Intermediate steps in the present method are shown in FIGS. 4 and 6. In FIG. 4, the two ends 2,3 of the webbing 1 are passed around the elongated hardware portion 11, then overlapped and stitched together in the standard fashion. In FIG. 6 the overlapped area is centered around the elongated hardware portion. To assist in assembly, the two sides of the attachment area may then be attached to each other with a light tack stitch 12. In the final step, the two sides of webbing are bonded using a confluence wrap of lighter webbing wrapped laterally around the grouped load bearing webbing and sewn with a box pattern harness stitch.

In order to allow the merged area to be wrapped around the attachment hardware without asymmetrically loading the two webbing sections, a technique is used to stitch the areas together with a bias to shorten the length of the stitch path on the interior webbing section. When the attachment pattern is sewn, the interior webbing segment is sewn on top of the exterior segment. The sewing machine operator manually deflects the webbing upward to induce curvature in the sewn area as shown in FIG. 7.

The invented method is useful in assembly of parachute harnesses and other uses.

Although the present invention has been described herein with respect to preferred embodiments, it will be understood that the foregoing description is intended to be illustrative, not restrictive. Modifications of the present invention will occur to those skilled in the art. All such modifications that fall within the scope of the appended claims are intended to be within the scope and spirit of the present invention.

I claim:

1. A method for attaching a flexible strap to load-bearing hardware comprising the steps of:
   a) providing a flexible strap with two ends;
   b) providing an elongated portion of hardware;
   c) passing one end of the strap around the elongated hardware portion;
   d) overlapping the two ends of the strap and stitching them together, creating a stitched overlap of the strap;
   e) wrapping the stitched overlap of the strap around the elongated portion of hardware;
   f) stitching through the strap adjacent the elongated portion of hardware, forming an eye in the stitched overlap of the strap around the elongated portion of hardware;
   whereby the elongated portion of hardware is retained in the eye of the stitched overlap of the strap.

2. The method of claim 1, wherein in step d) the overlapped ends of the strap are stitched together while held in a curve in the direction of curvature of the eye to be formed in the stitched overlap of the strap; whereby a load placed on the hardware results in equal distribution of stress in the two ends of the strap around the eye in the strap.

3. The method of claim 1, further including before step f) the additional step of placing a buffer material between the strap material and the elongated portion of hardware to protect the strap material from abrasion.

4. A load bearing attachment of a flexible strap to hardware, comprising:
   an elongated hardware portion;
   a flexible strap having two ends;
   the strap passed around the elongated hardware portion;
   the two strap ends overlapped and stitched together, forming an overlapped strap portion;
   the overlapped strap portion approximately centered on the elongated hardware portion;
   the overlapped strap portion stitched closed around the elongated hardware portion, forming an eye of the overlapped strap portion that retains the elongated hardware portion.

5. The load bearing attachment of claim 4, wherein the two strap ends are stitched together in a curved shape to form the overlapped portion with the direction of curvature of the eye.

6. The load bearing attachment of claim 5, wherein the overlapped strap portion is stitched closed around the elongated hardware portion with a confluence wrap around all layers of strap, with eye-closure stitching passing through the confluence wrap and all layers of strap adjacent the elongated hardware portion.

7. The load bearing attachment of claim 6, further including a buffer layer of low friction material wrapped around the elongated hardware portion, between the elongated hardware portion and the innermost layer of strap, the buffer layer in the form of a strap segment in an innermost layer of the eye between the strap layers.

* * * * *